United States Patent
Mogi et al.

(10) Patent No.: US 8,247,127 B2
(45) Date of Patent: Aug. 21, 2012

(54) FUEL CELL AND METHOD OF OPERATING FUEL CELL

(75) Inventors: Satoshi Mogi, Yamato (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1005 days.

(21) Appl. No.: 12/160,014

(22) PCT Filed: Mar. 5, 2007

(86) PCT No.: PCT/JP2007/054743
§ 371 (c)(1),
(2), (4) Date: Jul. 3, 2008

(87) PCT Pub. No.: WO2007/102609
PCT Pub. Date: Sep. 13, 2007

(65) Prior Publication Data
US 2009/0004515 A1    Jan. 1, 2009

(30) Foreign Application Priority Data
Mar. 6, 2006 (JP) ................................. 2006-059181

(51) Int. Cl.
*H01M 2/38* (2006.01)
(52) U.S. Cl. ...................... 429/455; 429/454; 429/452
(58) Field of Classification Search .................. 429/455, 429/454, 452
See application file for complete search history.

(56) References Cited

U.S. PATENT DOCUMENTS

| | | | |
|---|---|---|---|
| 6,329,092 B1 | 12/2001 | Maeda et al. | |
| 6,960,401 B2 | 11/2005 | Barton et al. | |
| 7,105,243 B2 | 9/2006 | Morishima et al. | |
| 7,153,598 B2 | 12/2006 | Summers et al. | |
| 7,316,853 B2 | 1/2008 | Takagi et al. | |
| 2007/0231644 A1 | 10/2007 | Kanno et al. | |

FOREIGN PATENT DOCUMENTS

| | | |
|---|---|---|
| JP | 7-105967 A | 4/1995 |
| JP | 2000-113896 A | 4/2000 |
| JP | 2001-229950 A | 8/2001 |
| JP | 2004-039513 A | 2/2004 |
| JP | 2004-095528 A | 3/2004 |
| JP | 2004-536438 A | 12/2004 |
| JP | 2005-044736 A | 2/2005 |
| JP | 2005-243477 A | 9/2005 |
| JP | 2005-353569 A | 12/2005 |
| WO | 2004-079845 A2 | 9/2004 |
| WO | 2007/102612 A1 | 9/2007 |

*Primary Examiner* — Helen O Conley
(74) *Attorney, Agent, or Firm* — Fitzpatrick, Cella, Harper & Scinto (57) ABSTRACT

A fuel cell stack is divided into a main power generation portion and a sub power generation portion. A variable load large in variation of output current is connected to the main power generation portion located upstream in a fuel flow and a steady load small in variation of output current is connected to the sub power generation portion located downstream in the fuel flow. This causes a fuel cell unit constituting the sub power generation portion to continue consuming a constant fuel by constant power generation and also causes hydrogen gas to continue flowing at a constant flow rate into the fuel cell unit, thereby preventing impurity gas concentrated and stored in the fuel cell unit from diffusing toward the upstream.

6 Claims, 11 Drawing Sheets

FUEL CELL AND METHOD OF OPERATING FUEL CELL

TECHNICAL FIELD

The present invention relates to a fuel cell having a plurality of fuel cell units wherein fuel supply spaces to which a gaseous fuel is supplied are communicated with each other, and more particularly to control for reducing the influence of impurity gas, such as nitrogen gas, that intruded into fuel supply spaces on the output.

BACKGROUND ART

A fuel cell in which fuel supply spaces each disposed on one side of an electrolyte layer and supplied with a gaseous fuel are communicated in series with each other has been put into practical use. Further, a flow-type fuel cell in which a plurality of fuel supply spaces are formed in a cascade system wherein the fuel supply spaces are connected in series such that the number of fuel supply spaces communicated in parallel with each other is gradually decreased toward a downstream side has also been put into practical use. By the cascade system, the reduction in flow rate on a downstream side of a gaseous fuel due to consumption of the gaseous fuel through the electrolyte layer can be compensated, and stable supply flow rate of the gaseous fuel in the fuel supply spaces can be secured from the most upstream side to the most downstream side.

An air breathing fuel cell in which a polymer electrolyte membrane is used as an electrolyte layer and one side of the polymer electrolyte membrane is in communication with the atmosphere, and which generates electric power by an electrochemical reaction of a gaseous fuel with oxygen from the atmosphere has been put into practical use. Since the polymer electrolyte membrane is not a completely airtight membrane, when a fuel supply space and a space communicating with the atmosphere are formed with the polymer electrolyte membrane therebetween, atmospheric nitrogen will intrude into the fuel supply space by concentration diffusion from the space communicating with the atmosphere. Since the atmospheric nitrogen that has intruded into the fuel supply space lowers the partial pressure of the gaseous fuel in the fuel supply space to lower the power generation efficiency, it is desirable to purge the impurity gas containing nitrogen in the fuel supply space to the atmosphere periodically.

U.S. Pat. No. 6,960,401 discloses a dead-ended fuel cell in which fuel supply spaces connected in a cascade system are purged. The connection of the fuel supply spaces in the cascade system concentrates and stores impurity gas in the fuel supply space located on the most downstream side.

The constant flow of a gaseous fuel formed in all the fuel supply spaces from the most upstream to the most downstream suppresses the storage of impurity gas in a space except the most downstream fuel supply space. Further, when the output voltage of the fuel cell unit generating electric power by using a fuel in the most downstream fuel supply space falls below a predetermined threshold due to the influence of stored impurity gas, a valve disposed on the downstream side in the most downstream fuel supply space is opened. At the same time, the gaseous fuel is injected into the most downstream fuel supply space from the upstream to discharge the concentrated impurity gas from the fuel supply space into the atmosphere.

In the fuel cell described in U.S. Pat. No. 6,960,401, the flow of gaseous fuel from upstream to downstream in the fuel supply spaces connected to each other in series stores impurity gas in the most downstream fuel supply space. The flow of the gaseous fuel into the most downstream fuel supply space precludes the concentrated impurity gas in the most downstream fuel supply space from diffusing upstream.

Therefore, the output of the fuel cell is stopped to discontinue the flow of the gaseous fuel, the concentrated impurity gas in the most downstream fuel supply space will diffuse upstream and fill the whole fuel cell with the impurity gas. Even when the output does not stop, if the output of the fuel cell is small, the impurity gas can not sufficiently be concentrated in the most downstream fuel supply space.

Further, when performing a purge operation in a state in which the impurity gas is not sufficiently concentrated, a large amount of the gaseous fuel is wastefully discharged into the atmosphere. For this reason, a device on which the fuel cell is mounted needs to be designed on the assumption that a large amount of gaseous fuel is discharged.

Moreover, in a state in which the impurity gas is not sufficiently concentrated, it takes a considerable time until the output voltage of the most downstream fuel cell unit falls below a predetermined threshold, which may seriously delay a purge operation. Even when the impurity gas in the most downstream fuel supply space is low in concentration, a critical amount of the impurity gas is stored all over the fuel cell. Increasing output current in this state accelerates the flow of gaseous fuel from upstream toward downstream to discharge impurity gas downstream, thereby rapidly increasing the concentration of impurity gas in the most downstream fuel supply space. This may stop power generation in the most downstream fuel cell unit. Furthermore, in the case of a fuel cell in which all the fuel cell units are connected to each other in series from upstream to downstream, the output of the whole fuel cell may stop.

That is to say, the fuel cell disclosed in U.S. Pat. No. 6,960,401 can perform an effective purge operation in an appropriate timing in applications where the variation of load is small and a large amount of output current needs to be continuously flowed steadily. However, the purge operation is apt to be inappropriate in applications where the start and stop of output are repeated, output current smaller than that of a designed value needs to be continuously flowed, or the variation of load is large. In addition, gaseous fuel will be wastefully consumed by the purge operation.

DISCLOSURE OF THE INVENTION

The present invention is directed to a fuel cell that can reduce the influence of impurity gas stored in the fuel supply space even in applications where the start and stop of output are repeated, a small output current is continuously output, or the load largely fluctuates. In addition, the present invention is directed to a fuel cell that can perform an effective purge operation in an appropriate timing.

A fuel cell according to one aspect of the present invention has such a configuration that a plurality of fuel cell units each having a fuel supply space into which a gaseous fuel is supplied are disposed with the fuel supply spaces communicating in series with each other. The fuel cell comprises a downstream power generation portion comprised of at least one of the fuel cell units located downstream in the direction of fuel supply and an upstream power generation portion comprised of at least one of the fuel cell units located upstream of the downstream power generation portion. A load is connected to the downstream power generation portion, which is smaller in variation of power than one for the upstream power generation portion.

A fuel cell according to another aspect of the present invention has such a configuration that a plurality of fuel cell units each having a fuel supply space into which gaseous fuel is supplied are disposed with the fuel supply spaces communicating in series with each other. The fuel cell comprises a downstream power generation portion comprised of at least one of the fuel cell units located downstream in the direction of fuel supply, and an output control unit for controlling a load connected to the downstream power generation portion to continue extracting output current of a level above a predetermined minimum level out of the downstream power generation portion.

In the fuel cell according to the one aspect of the present invention, a load smaller in output variation selected of a plurality of loads provided for the fuel cell is connected to the downstream power generation portion downstream in the fuel flow. The load smaller in output variation stably ensures the output current of the fuel cell unit in the downstream power generation portion. This ensures the flow of the gaseous fuel enough to sufficiently concentrate impurity gas in the fuel supply space of the downstream power generation portion to thereby prevent the impurity gas from diffusing upstream.

Thus, sufficiently concentrated impurity gas is continuously stored in the fuel supply spaces of the downstream power generation portion even if the start and stop of output are repeated at the upstream power generation portion, a small amount of current is continuously output, or a load largely fluctuates. The impurity gas stored in the downstream power generation portion hardly diffuses upstream.

The variation of the concentration of impurity gas in the fuel supply space of the downstream power generation portion is suppressed even if output current is sharply increased after a small amount of current has been continuously output for a long period of time and large variance in load is repeated. Since the impurity gas is confined in a high concentrated in the fuel supply space of the downstream power generation portion, most of the impurity gas in the whole fuel cell can be discharged outside the system even by a small amount of the gaseous fuel corresponding to the fuel supply space of the downstream power generation portion (or on the most downstream side). Purging the highly concentrated impurity gas reduces the wasteful discharge of the gaseous fuel into the atmosphere caused by the purge operation to make the fuel gas in a fuel tank last longer.

When the purge timing is controlled by the output voltage of the fuel cell unit in the downstream power generation portion, the possibility of resulting in sudden stoppage of power generation due to increase in the concentration of the impurity gas in comparison with the control described in U.S. Pat. No. 6,960,401.

In the fuel cell according to the another aspect of the present invention, the output control unit secures the output current in the downstream power generation portion at a level above the minimum level. The minimum level refers to an output current such that impurity gas can sufficiently be concentrated in the most downstream fuel cell unit of the downstream power generation portion to ensure the flow of the gaseous fuel enough to prevent the impurity gas from diffusing upstream. Thus, an effective purge operation can be performed at an appropriate timing even in applications where the start and stop of output are repeated, a small amount of current is continuously output, or a load largely fluctuates as is the case with the fuel cell according to the one aspect of the present invention. The possibility is deduced of sudden stoppage of power generation due to increase in the concentration of impurity gas at the time of increasing the output.

Further features of the present invention will become apparent from the following description of exemplary embodiments with reference to the attached drawings.

BEST MODE FOR CARRYING OUT THE INVENTION

A fuel cell, which is an embodiment of the fuel cell of the present invention, will be described in detail below referring to the drawings. The fuel cell of the present invention is not limited to the restrictive configuration in each embodiment described below. As long as power generation is carried out by supplying a gaseous fuel to a fuel supply space of a fuel cell unit, the present invention can be realized also by other embodiments wherein a part of or entire configuration in each embodiment is substituted by an alternative configuration.

Although power generation is carried out using hydrogen gas stored in a fuel tank in the embodiments, a liquid fuel, such as methanol containing hydrogen atoms may be stored in the fuel tank and subjected as needed to a reforming reaction to generate hydrogen gas in a required amount, which may then be supplied to a fuel supply space in a fuel cell unit.

The fuel cells of the embodiments can be implemented as independent fuel cells detachably equipped in portable electronic devices, such as digital cameras, digital camcorders, projectors, printers, and notebook personal computers. They can also be implemented in a form in which only a power generating section of the fuel cell is integrally assembled in an electronic device, which is attachable to and detachable from a fuel tank.

EMBODIMENT 1

Figure 1:
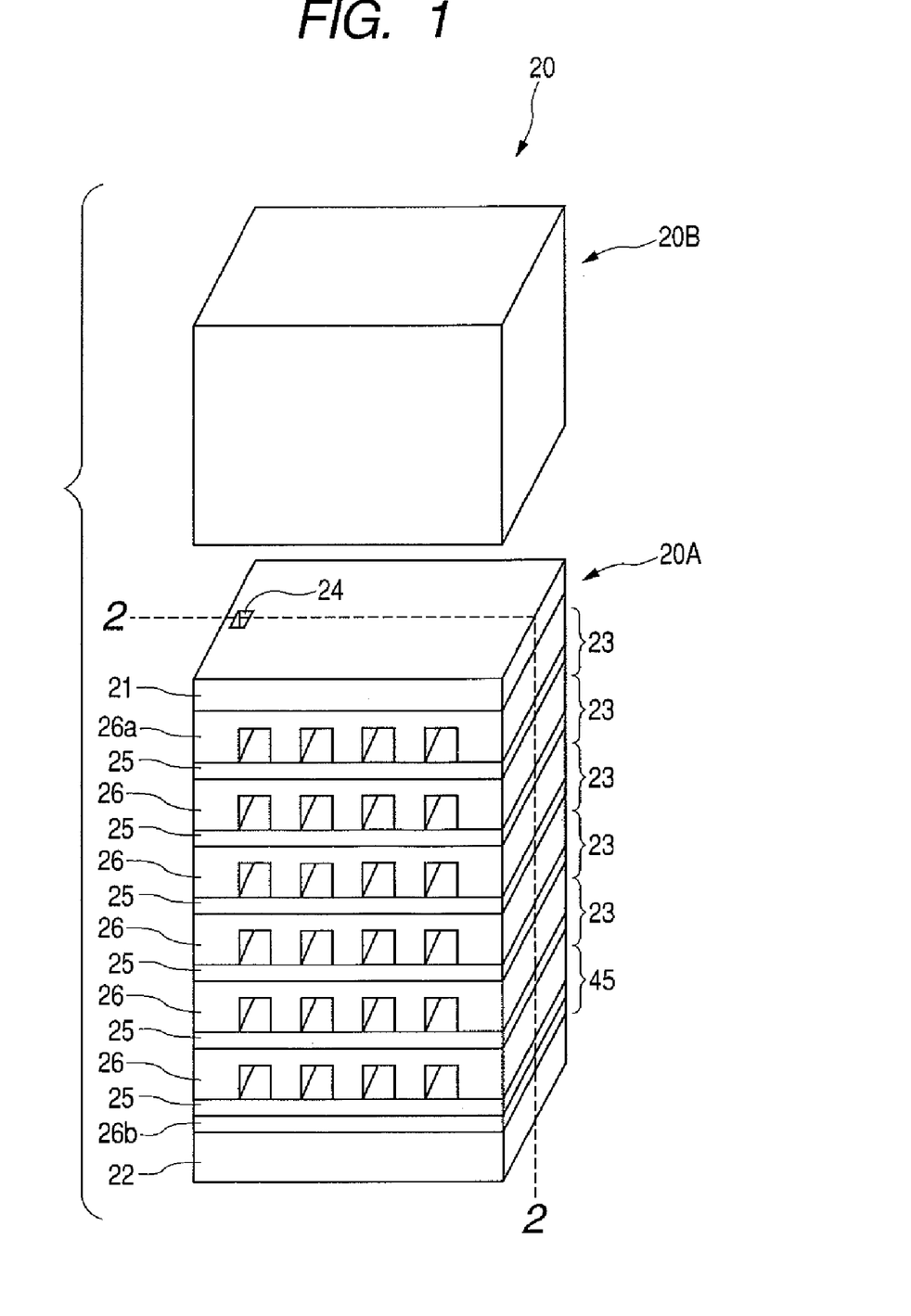
FIG. 1 is a schematic perspective view illustrating a fuel cell of Embodiment 1 of the present invention.
Figure 2:
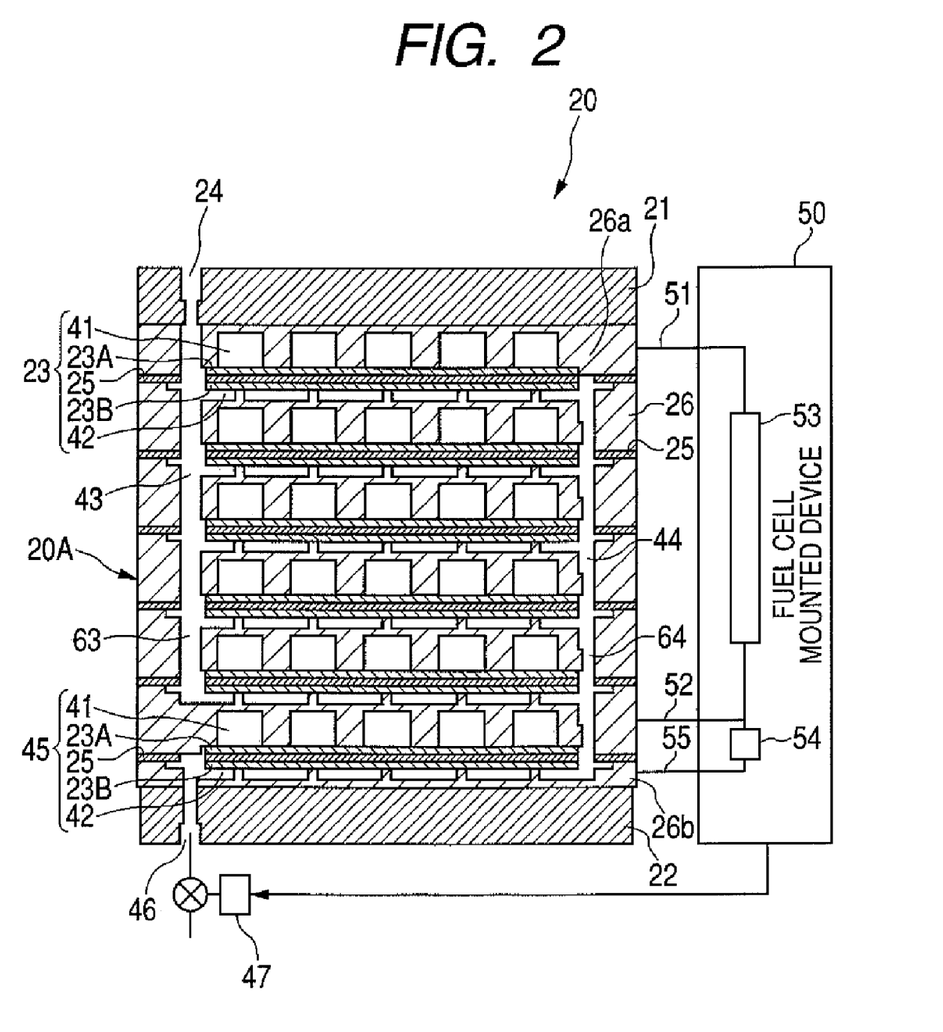
FIG. 2 is a schematic cross-sectional view illustrating a fuel cell stack taken along chain line 2-2 of FIG. 1.
Figure 3A:
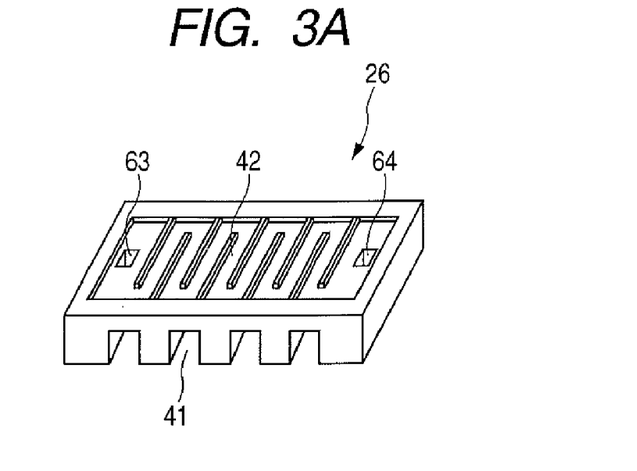
FIGS. 3A, 3B, and 3C are schematic perspective views each illustrating a separator.
Figure 3B:
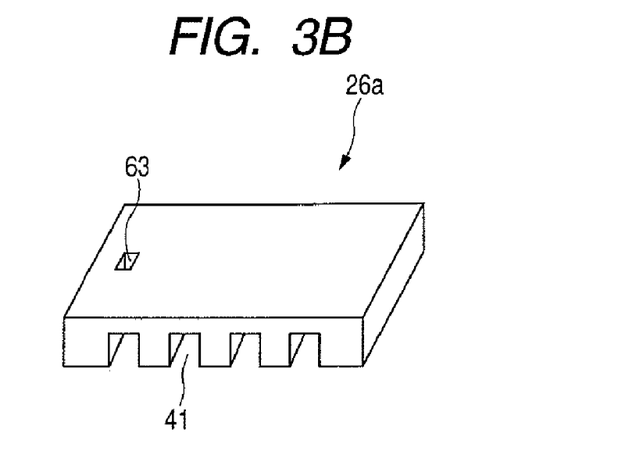
Figure 3C:
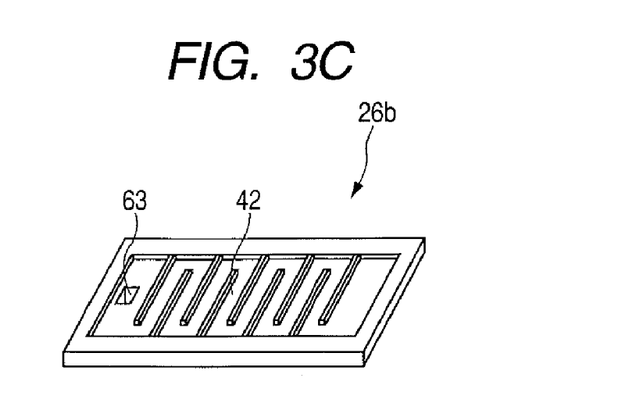
Figure 4:
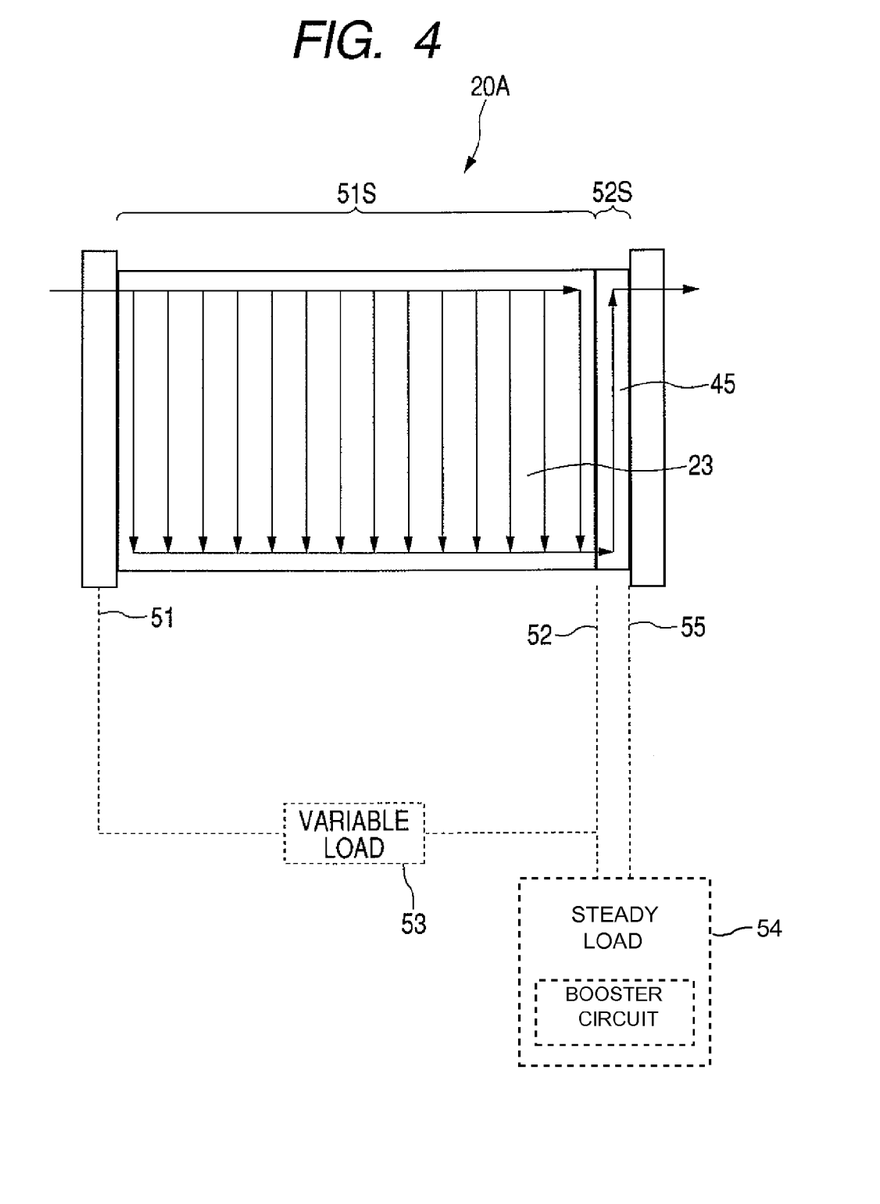
FIG. 4 is a schematic diagram illustrating the fuel cell of Embodiment 1.

FIG. 1 is a schematic perspective view of a fuel cell of Embodiment 1; FIG. 2 is a schematic cross-sectional view of a fuel cell stack taken along chain line 2-2 in FIG. 1; FIGS. 3A, 3B and 3C are schematic perspective views of a separator; and FIG. 4 is a schematic structural diagram of fuel cell of Embodiment 1.

As shown in FIG. 1, a fuel cell 20 is assembled by detachably connecting a fuel cell stack 20A to a fuel tank 20B. In the fuel cell stack 20A, a plurality of fuel cell units 23 and 45 are stacked between a pair of end plates 21 and 22. The fuel tank 20B is filled with hydrogen gas, and hydrogen gas adjusted to have a required pressure is supplied into the fuel cell stack 20A.

The end plate 21 is provided with an inlet 24 of the fuel supply spaces to which the fuel tank 20B is connected to supply hydrogen gas into the fuel cell stack 20A. In each of the membrane electrode assemblies 25, catalyst layers supporting platinum fine particles are formed on the upper and lower surfaces of a solid polymer electrolyte membrane. The catalyst layer on the upper surface in FIG. 1 is an oxidizer electrode; and the catalyst layer on the lower surface is a fuel electrode. The plurality of membrane electrode assemblies 25 are stacked via separators 26.

As shown in FIG. 2, gas diffusion layers 23A and 23B are disposed between the membrane electrode assemblies 25 and the separators 26. The gas diffusion layers 23A and 23B are formed of a porous sheet material having properties to permeate reactants and also having electrical conductivity. Examples of materials preferably used in the gas diffusion layers 23A and 23B include carbon cloth and carbon paper.

Atmospheric oxygen intrudes via an oxidizer flow path 41 provided in each separator 26 into a fuel cell unit 23 or 45 of each stage in a direction perpendicular to the drawing plane of FIG. 2, and diffused and supplied via the gas diffusion layers 23A to the entire upper surface of the membrane electrode assemblies 25.

Hydrogen gas is supplied via the fuel flow path inlet 24 into the supply-side main flow path 43 provided on the left side in the figure, branched from the supply-side main flow path 43, and distributed and supplied to the fuel flow paths 42 of the fuel cell units 23 of the respective stages. The supply-side main flow path 43 is formed by superimposing the through-holes 63 provided in the respective separators 26 and 26a.

In the catalyst layer of the membrane electrode assembly 25 contacting the gas diffusion layer 23A, hydrogen gas is decomposed into hydrogen atoms to be ionized by a catalytic reaction, and hydrogen ions are supplied to the polymer electrolyte membrane. In the catalyst layer of the membrane electrode assembly 25 contacting the gas diffusion layer 23A, oxygen combines with hydrogen ions supplied from the polymer electrolyte membrane by a catalytic reaction to generate water molecules. The polymer electrolyte membrane of the membrane electrode assembly 25 transfers hydrogen ions from the gas diffusion layer 23B side to the gas diffusion layer 23A side. Excessive electrons on the gas diffusion layer 23B side produced by the electrochemical reaction move to the gas diffusion layer 23A side through an external circuit.

The fuel flow paths 42 of the fuel cell units of the respective stages join to a discharge-side main flow path 44 on the downstream side (the right side in the figure), and the discharge-side main flow path 44 is connected to the fuel flow paths 42 of the most downstream fuel cell unit 45. The discharge-side main flow path 44 is formed by superimposing the through-holes 64 provided in the respective separators 26.

A through-hole 63 provided on the downstream side of the fuel flow path 42 of the fuel cell unit 45 is connected to a fuel flow path outlet 46 of the end plate 22 and a purge valve 47 is disposed on the fuel flow path outlet 46. The purge valve 47 is usually closed, so that the fuel cell stack 20A is operated in a dead-ended mode. Since the dead-ended fuel cell stack 20A does not require pipes and pumps, the configuration of which is suited for size reduction of the fuel cell 20.

FIG. 3A is a schematic perspective view illustrating the separator 26. FIG. 3B is a schematic perspective view illustrating the separator 26a. FIG. 3C is a schematic perspective view illustrating the separator 26b.

As shown in FIG. 3A, parallel channel-shaped oxidizer flow paths 41 are formed on the front surface (downside, in FIG. 3A) of the separator 26. As shown in FIG. 2, the oxidizer flow paths 41 supply atmospheric oxygen via the gas diffusion layers 23A to the oxidizer electrodes of the membrane electrode assemblies 25.

On the rear surface (upside, in FIG. 3A) of the separator 26, a switchback-shaped fuel flow path 42 is formed. As shown in FIG. 2, the fuel flow paths 42 supply hydrogen gas via the gas diffusion layers 23B to the fuel electrodes of the membrane electrode assemblies 25.

Further, on one end of the separator 26, a through-hole 63 for leading hydrogen gas supplied from the fuel flow path inlet 24 in FIG. 2 to the fuel cell unit 23 of each stage is provided. On the other end of the separator 26, a through-hole 64 for leading hydrogen gas from the fuel cell unit 23 of each stage to the fuel cell unit 45 is provided.

The fuel cell stack 20A is of an open-air type in which the oxidizer electrode is open to the atmosphere, so that the principal component in impurity gas intruding the fuel flow path 42 is nitrogen gas contained in the air. In the fuel cell stack 20A, nitrogen gas intrudes from the oxidizer electrode having a nitrogen partial pressure of about 80 kPa to the fuel flow path 42 having a nitrogen partial pressure of about 0 Pa mainly via the membrane electrode assembly 25 by concentration diffusion. The nitrogen gas intrusion rate at the membrane electrode assembly 25 varies with the current density of the generated output. As a result of an experiment, it was confirmed that the nitrogen gas intrusion rate per unit area of the membrane electrode assembly 25 was about $1.7 \times 10^{-5}$ ml/sec·cm².

In the fuel cell stack 20A according to Embodiment 1, the configuration of the fuel flow path 42 connected in series concentrates and stores impurity gas in the fuel flow path 42 of the most downstream fuel cell unit 45. The flow of hydrogen gas formed in the upstream fuel cell units 23 gradually increases the concentration of the impurity gas in the fuel flow path 42 of the fuel cell unit 23 toward the downstream. Hydrogen gas having the impurity gas concentration increased in the fuel cell units 23 flows into the most downstream fuel cell unit 45 through the discharge-side main flow path 44.

The concentration of the impurity gas at the inlet of the fuel flow path 42 of the fuel cell unit 45 is balanced by that of the discharge-side main flow path 44. The membrane electrode assembly 25 of the fuel cell unit 45 receives hydrogen gas while leaving impurity gas to thereby form a flow of hydrogen gas toward the downstream also in the fuel cell unit 45, so that the concentration of the impurity gas gradually increases toward the downstream. Thereby, the impurity gas is stored in a high concentration in the fuel flow path 42 of the fuel cell unit 45. The impurity gas in the fuel flow path 42 of the fuel cell unit 45 is so driven by the difference in concentration as to diffuse toward the upstream. However, hydrogen gas flowing into the fuel flow path 42 of the fuel cell unit 45 prevents the impurity gas from diffusing, and the flow of hydrogen gas in the fuel flow path 42 allows the impurity gas to drift downstream to keep the high concentration of the impurity gas.

As illustrated in FIG. 2, in the fuel cell stack 20A, power is extracted separately through the two of an upstream terminal member 51 and a downstream terminal member 52. The output voltage of N-stage fuel cell units 23 connected in series is taken between the upstream terminal member 51 and the downstream terminal member 52. The power of the most downstream fuel cell unit 45 is output between the downstream terminal member 52 and a terminal member 55. The upstream terminal member 51, the downstream terminal member 52, and the terminal member 55 are connected to a device 50 on which the fuel cell is mounted to supply electric power thereto.

A steady load 54 which is smaller in variation in power of a plurality of loads of the fuel cell mounted device 50 is connected between the downstream terminal member 52 and the terminal member 55, and the power generation output of the fuel cell unit 45 is allocated thereto. A variable load 53 which is high in variation in power is connected between the upstream terminal member 51 and the downstream terminal member 52 and the power generation output of the fuel cell units 23 is allocated thereto.

As schematically illustrated in FIG. 4, a main power generation portion 51S is constituted by N fuel cell units 23 disposed on the upstream side in the fuel flow. The variable load 53 supplied with power by the fuel cell stack 20A is connected to the main power generation portion 51S. The variable load 53 is a load which greatly varies in power consumption according the operation state of the fuel cell mounted device 50, such as a CPU and a drive motor. The variable load 53 may be connected to the main power generation portion 51S through a circuit such a DC-DC converter which is necessary to meet requirements for voltage from the fuel cell mounted device 50. Incidentally, the arrows in FIG. 4 schematically illustrate the flow of the fuel gas.

On the other hand, the most downstream fuel cell unit 45 of the fuel cell stack 20A forms a sub power generation portion 52S and is connected to the steady load 54. The steady load 54 includes a booster circuit for providing a necessary power supply voltage and continuously consumes nearly constant power irrespective of the operation state of the fuel cell mounted device 50, such as a cooling fan or a back light for a liquid crystal device.

For this reason, no matter how much the power consumption of the variable load 53 changes, the most downstream fuel cell unit 45 continues constant power generation to consume a constant amount of hydrogen gas per second. Since hydrogen gas continues flowing into the most downstream fuel cell unit 45 at a constant flow rate, the impurity gas stored in a high concentration in the most downstream fuel cell unit 45 is difficult to diffuse toward the upstream.

Figure 5A:
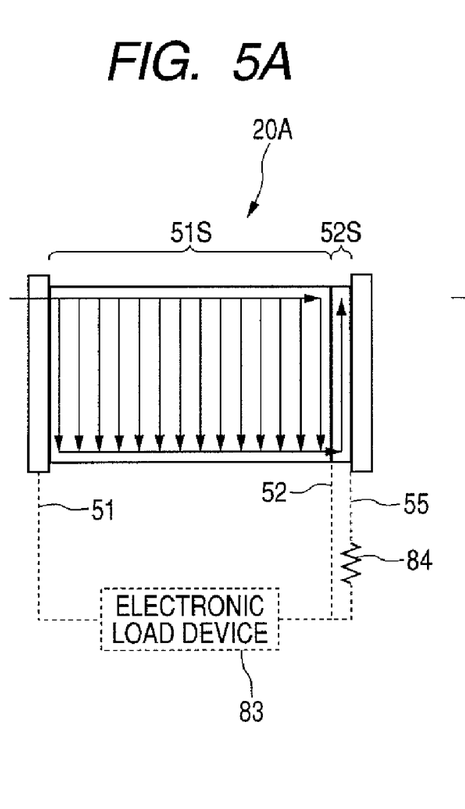
FIGS. 5A and 5B are schematic diagrams illustrating evaluation experiments for stability of fuel cell units with respect to variation of a load.
Figure 5B:
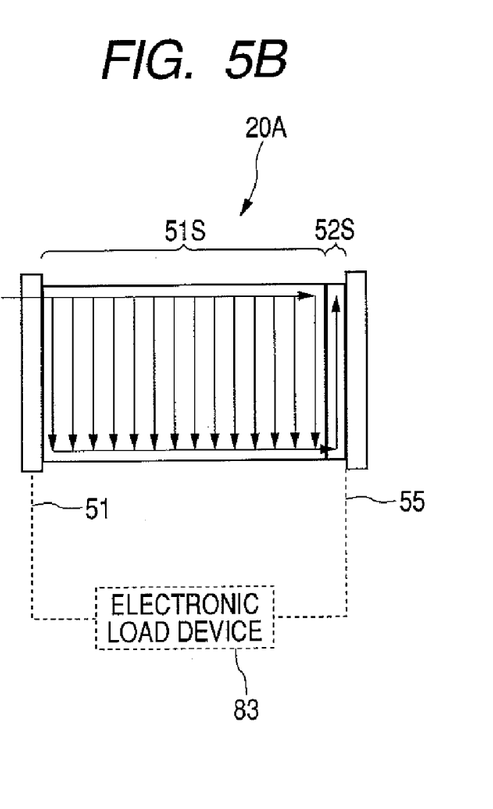
Figure 6A:
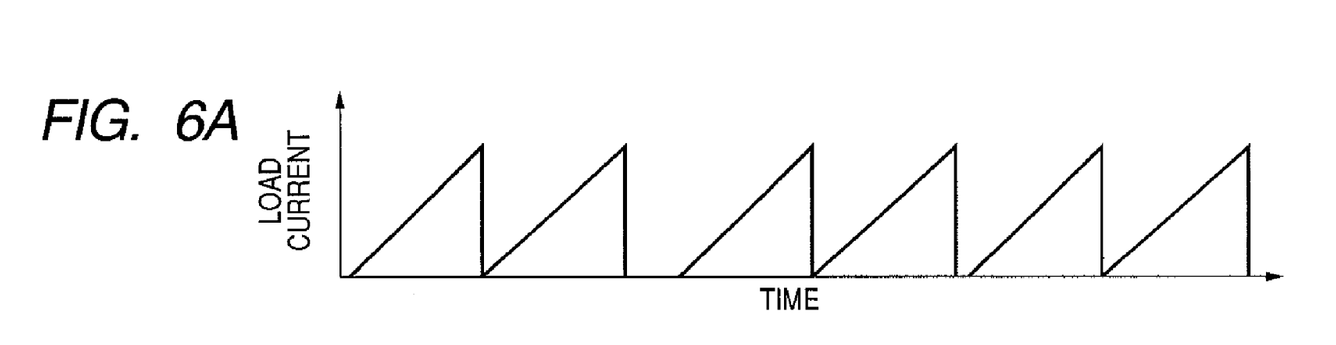
FIGS. 6A and 6B are graphical representations illustrating the results of evaluation experiments for stability.
Figure 6B:
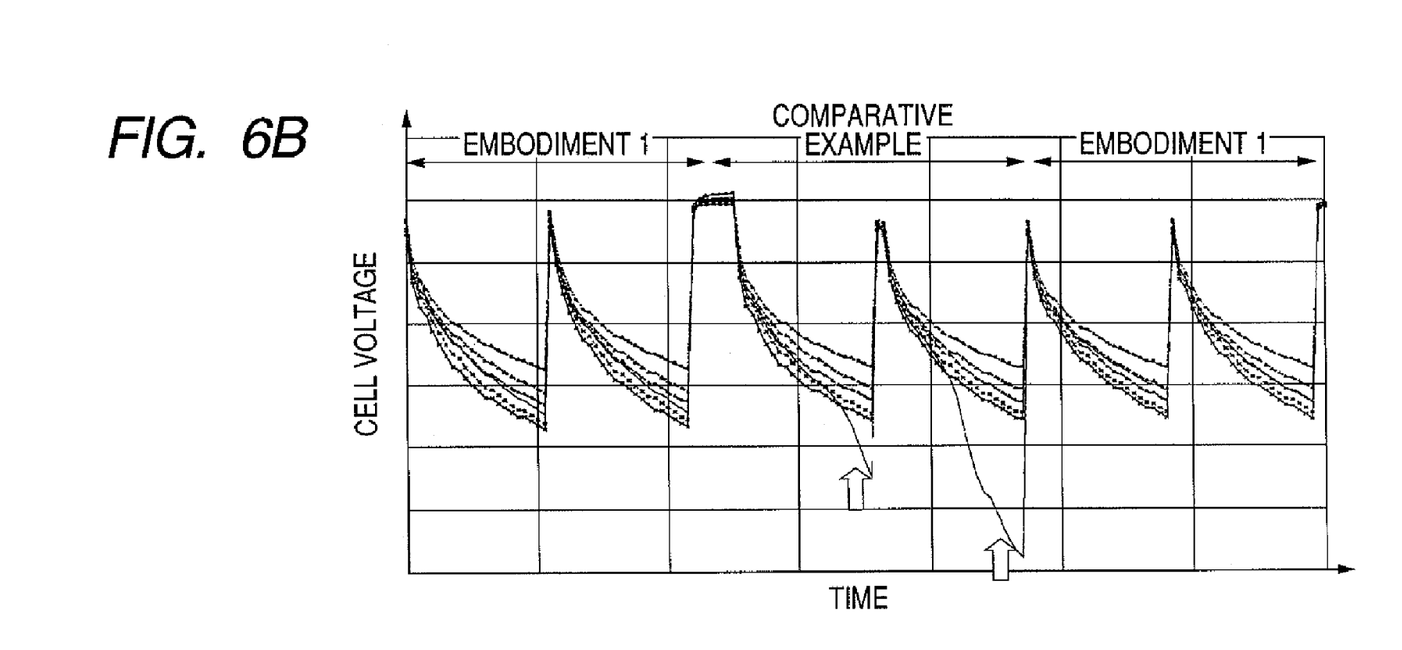

FIGS. 5A and 5B are schematic diagrams illustrating evaluation experiments for stability of fuel cell units with respect to variation of load, and FIGS. 6A and 6B are graphical representations illustrating the results of evaluation experiments for stability.

As illustrated in FIGS. 5A and 5B, by using an electronic load device 83, the output current of the fuel cell stack 20A was varied with a constant pattern to evaluate the stability of the fuel cell stack 20A against variation in load. In Embodiment 1 illustrated in FIG. 5A, a resistor load 84 is connected to the sub power generation portion 52S to extract a stable current and an electronic load device 83 is connected to the main power generation portion 51S. On the other hand, in a comparative example illustrated in FIG. 5B, the sub power generation portion 52S is connected to the main power generation portion 51S in series and the electronic load device 83 is connected therebetween. The electronic load device 83 is constituted of a variable voltage regulator circuit. As illustrated in FIG. 6A, a load resistance is varied to change a terminal voltage in a predetermined triangular wave form, wherein the abscissa represents time and the ordinate indicates a load current applied to the fuel cell stack 20A by the electronic load device 83.

In FIG. 6B, changes in electromotive force of the fuel cell units 23 in the main power generation portion 51S during the experiment are illustrated.

As illustrated in FIG. 6B, the outputs of the fuel cell units 23 of the main power generation portion 51S in the connection of Embodiment 1 sufficiently follow the increase in the load current. In other word, the output voltages of the fuel cell units 23 decrease as the load current increases, but there is no case where the output voltage of any fuel cell unit 23 significantly drops. Therefore, the fuel cell 20 of Embodiment 1 can supply stable output to the fuel cell mounted device 50 irrespective of variation in load.

As illustrated in FIG. 6B, in the connection of the comparative example, on the other hand, the output voltage of a part of the fuel cell units 23 of the main power generation portion 51S does not follow the increase in the load current. In other words, the output voltage of a fuel cell unit (indicated by the thick solid arrows in the figure) sharply drops as the load current increases. Thus, a conventional fuel cell connected by the method used in the comparative example cannot supply stable output to the fuel cell mounted device 50 when the variation in load is relatively large.

As illustrated in FIG. 4, in the fuel cell stack 20A according to Embodiment 1, the steady load 54 is connected to the sub power generation portion 52S independently of the main power generation portion 51S. This causes the sub power generation portion 52S to start power generation at least before the main power generation portion 51S starts power generation. This enables the impurity gas to be concentrated to a high concentration and confined in the sub power generation portion 52S.

Further, even if the variable load 53 varies to decrease the output current of the main power generation portion 51S, the impurity gas in the sub power generation portion 52S will not diffuse into the main power generation portion 51S, thereby keeping the concentration of the impurity gas low in the main power generation portion 51S. For this reason, even if the variable load 53 varies to sharply increase the output current of the main power generation portion 51S, the main power generation portion 51S can supply stable electromotive force which is free from the influence of the impurity gas. In other words, the fuel cell stack 20A is provided which can accommodate variation in load.

Next, the control of a purge operation is described below. As illustrated in FIG. 2, the fuel cell mounted device 50 controls the purge valve 47 to perform a purge operation in the fuel cell stack 20A. The purge valve 47 can be opened and closed by hand or an actuator.

The fuel cell mounted device 50 activates the purge valve 47 when the output voltage of the most downstream fuel cell unit 45 (the sub power generation portion 52S) falls below a predetermined minimum level. Alternatively, when a current flowing into the steady load 54 connected to the sub power generation portion 52S as illustrated in FIG. 4 falls below a predetermined minimum level, a determination is made. In other words, when the output voltage of the sub power generation portion 52S falls, the fuel cell mounted device 50 determines that the decrease in the output of the sub power generation portion 52S is attributed to the stored impurity gas and then perform the purge operation. The purge operation is conducted in such a manner that the purge valve 47 is opened for 0.1 seconds and then closed and such an operation is repeated three times at an interval of one second. Thereby, the impurity gas stored in a high concentration in the most downstream fuel cell unit 45 is discharged from the fuel cell stack 20A into the atmosphere, thus enabling stable power generation of the fuel cell 20 to continue for a long period of time.

Figure 7A:
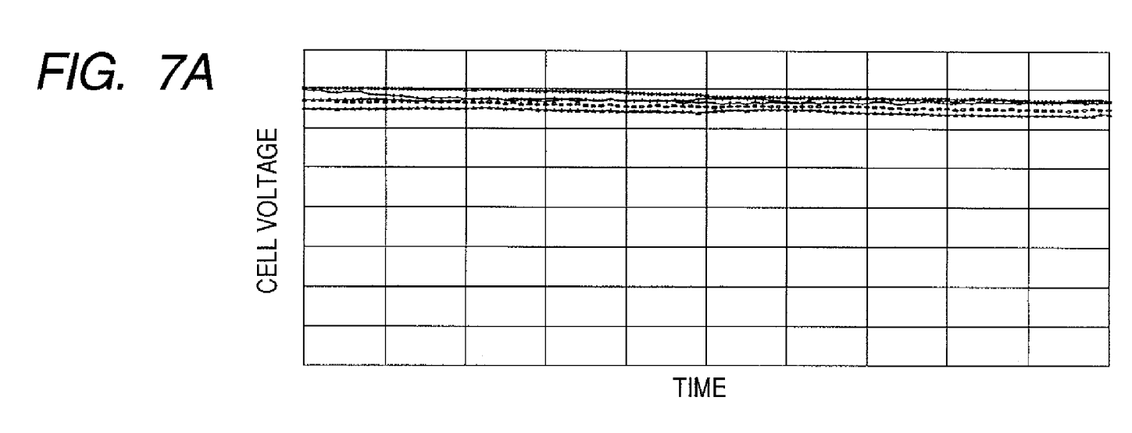
FIG. 7A is a graphical representation illustrating the output voltage of fuel cell units 23 of a main power generation portion 51S.
Figure 7B:
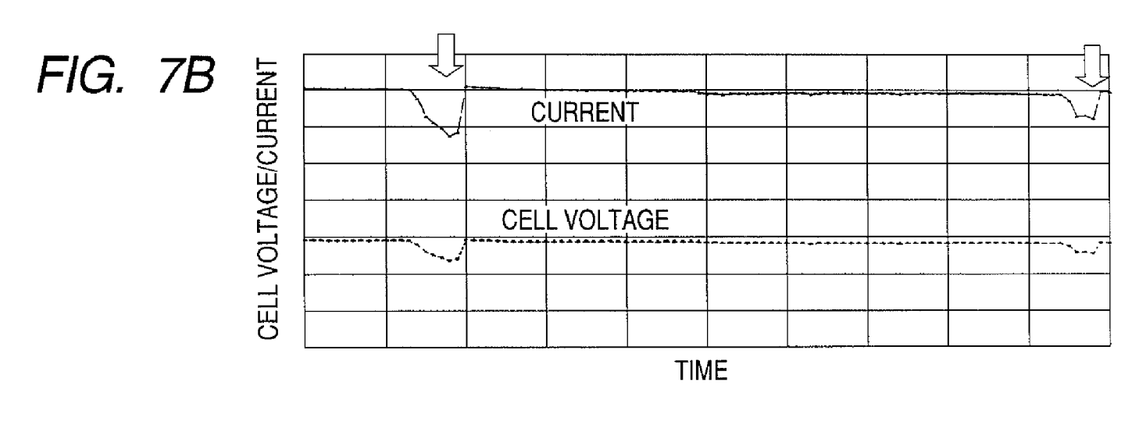
FIG. 7B is a graphical representation illustrating the output voltage and output current of a fuel cell unit 45 of a sub power generation portion 52S.

FIG. 7A illustrates voltage outputs from the fuel cell units 23 of the main power generation portion 51S obtained when the fuel cell stack 20A of Embodiment 1 is connected to the electronic load device 83 as illustrated in FIG. 5A. FIG. 7B illustrates a voltage output from the fuel cell unit 45 of the sub power generation portion 52S and a current flowing through the resistor load 84 connected to the sub power generation portion 52S at that time.

When the fuel cell 20 generates power, lowering in the output of the fuel cell unit 45 of the sub power generation portion 52S was observed as indicated by the thick solid arrows in FIG. 7B. The lowering in output is caused by stored impurity gas.

When the lowering is detected and the purge operation is performed, the output of the sub power generation portion 52S is recovered. During the purge operation, output voltages of the fuel cell units 23 of the main power generation portion 51S are stable. That is to say, the influence of impurity gas on the main power generation portion 51S can be eliminated.

Thus, with the fuel cell 20 according to Embodiment 1, by monitoring the output of the sub power generation portion 52S, the storage of a certain amount of concentrated impurity gas in the fuel cell unit 45 can be detected. Further, by performing a minimum required purge operation to such an extent as to slightly exceed the volume of the fuel cell unit 45, most of the impurity gas in the fuel cell stack 20A can be expelled. This recovers the fuel cell stack 20A in the state where the previous purge operation has been just finished, thereby enabling the fuel cell stack 20A to continue to supply the fuel-cell mounted device 50 with a stable electromotive force.

MODIFICATION OF EMBODIMENT 1

Figure 8A:
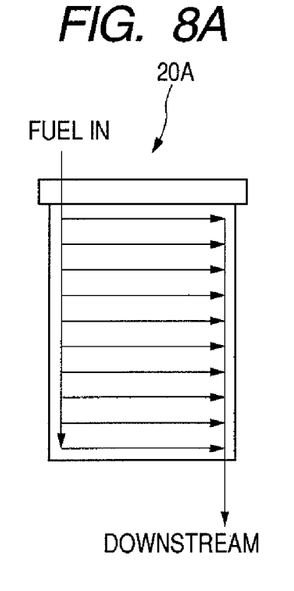
FIGS. 8A, 8B, and 8C are schematic diagrams illustrating patterns for connecting fuel flow paths.
Figure 8B:
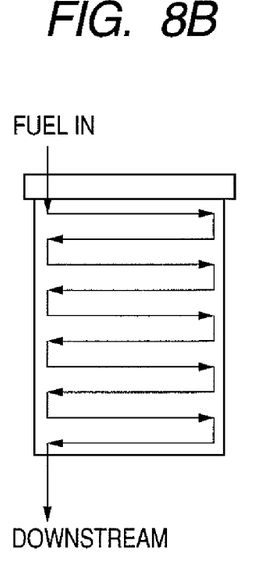
Figure 8C:
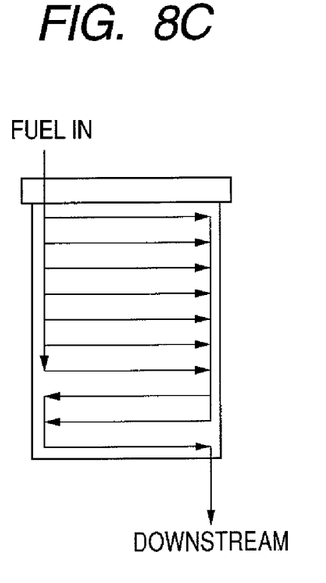
Figure 9:
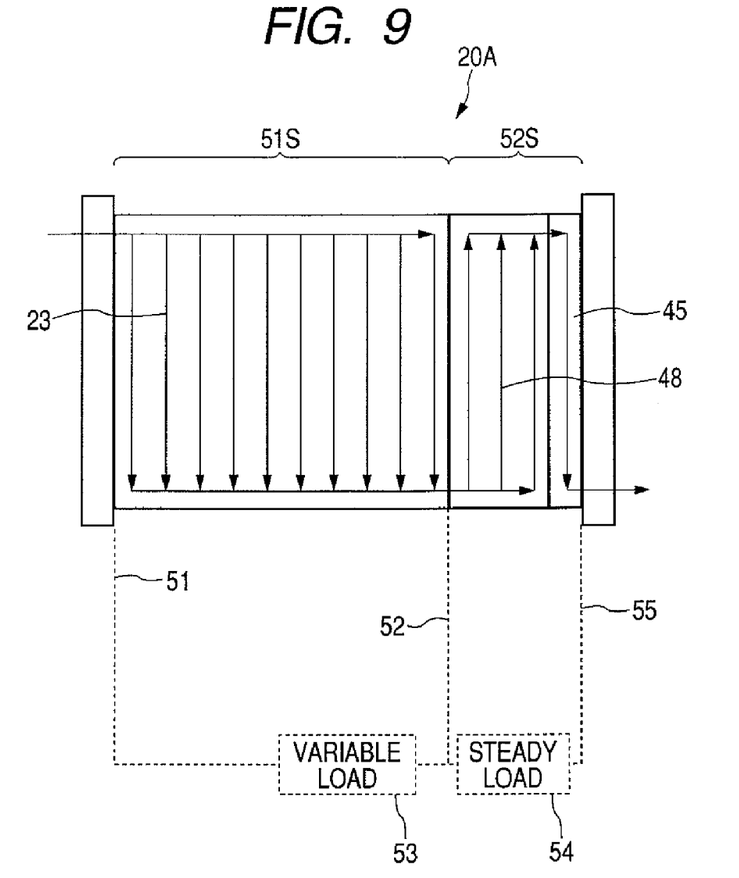
FIG. 9 is a schematic diagram of a modification with four-stage fuel cell units on the downstream side constituting a sub power-generation portion.
Figure 10:
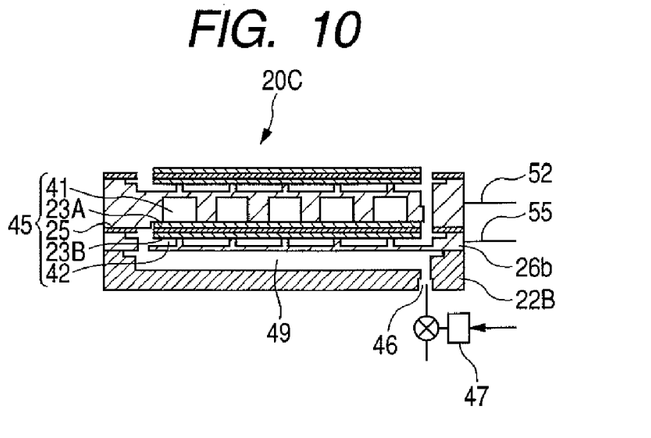
FIG. 10 is a schematic structural diagram of a modification in which a buffer space is connected to the downstream of the sub power-generation portion.

FIGS. 8A, 8B, and 8C are schematic diagrams illustrating connection patterns of fuel flow paths. FIG. 9 is a schematic diagram of a modification with four-stage fuel cell units on the downstream side taken adopted as a sub power-generation portion. FIG. 10 is a schematic cross-sectional view of a modification in which a buffer space is provided in communication with the downstream of the sub power generation portion.

While the fuel flow path 42 of the main power generation portion 51S in the fuel cell stack 20A of Embodiment 1 illustrated in FIG. 4 has a shape of a parallel flow pattern illustrated in FIG. 8A, the fuel flow path 42 of the main power generation portion 51S may be a shape of a serial flow pattern illustrated in FIG. 8B, or of a cascade flow pattern illustrated in FIG. 8C.

While the sub power generation portion 52S in Embodiment 1 is formed by one-stage fuel cell unit 45 as illustrated in FIG. 4, it may be formed by a plural-stage fuel cell unit. For example, the cascade flow pattern as illustrated in FIG. 9 may used to connect the fuel cell units 23, 48 and 45 with each other in series, thereby allocating the sub power generation portion 52S to the downstream four-stage fuel cell units 48 and 45. The upstream and the downstream terminal member 51 and 52 are drawn from the fuel cell stack 20A. The steady load 54 which is small in variation of power is connected to the sub power generation portion 52S. The variable load 53 which is large in variation of power is connected to the main power generation portion 51S.

In the fuel cell stack 20A according to Embodiment 1, a buffer space for storing impurity gas may be provided in communication with the downstream of the fuel cell unit 45 constituting the sub power-generation portion 52S. As illustrated in FIG. 10, for example, a recess 49 is formed in the upper surface of the end plate 22B to provide a buffer space between the upper surface and the separator 26b.

In the recess 49 of the buffer space between the fuel cell unit 45 and the purge valve 47, impurity gas of a high concentration which is balanced by the impurity gas concentration at the downstream of the fuel cell unit 45 is stored.

In the fuel cell stack 20A according to Embodiment 1, it is desirable that the sub power generation portion 52S starts power generation at least before the main power generation portion 51S starts power generation. The steady load 54 connected to the sub power generation portion 52S may be a resistor with a certain resistance, or may be connected to a control device for controlling the operation of the fuel cell 20.

The fuel cell 20 according to Embodiment 1 is provided with the fuel cell stack 20A in which the fuel cell units 23 and 45 are stacked. However, the fuel cell 20 may be formed in such a manner that a plurality of fuel cell units are two-dimensionally disposed on a common fuel supply substrate and the respective fuel supply spaces are in communication with each other in series (including a cascaded flow pattern).

EMBODIMENT 2

Figure 11:
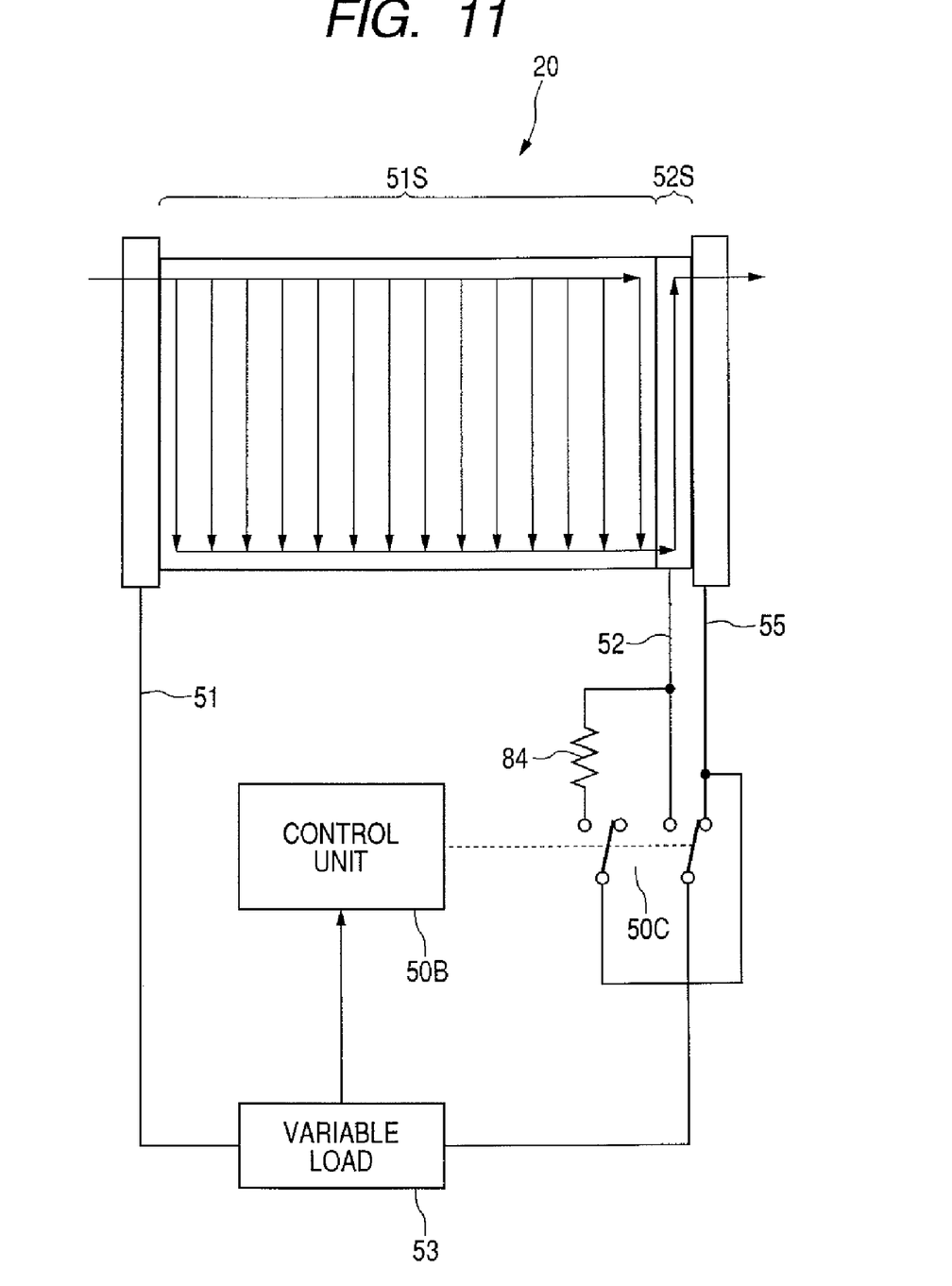
FIG. 11 is a schematic diagram illustrating the control in Embodiment 2.

FIG. 11 is a schematic diagram illustrating the control performed in Embodiment 2. In Embodiment 2, the upstream and the downstream terminal member 51 and 52 are switched according to a variable load by using the same fuel cell stack 20A as used in Embodiment 1. Other than that, the configuration of Embodiment 2 is the same as that of Embodiment 1, so that the elements which are common to those in FIGS. 2 and 4 are identified by like numerals and characters and detailed description thereof will be omitted.

As illustrated in FIG. 11, the upstream and the downstream terminal members 51 and 52 and a terminal member 55 are connected to the fuel cell stack 20A. A two-system switch 50C switches the downstream terminal member 52 and the terminal member 55 with respect to the variable load 53 and, at the same time and connects the resistor load 84 between the downstream terminal member 52 and the terminal member 55 when the downstream terminal member 52 is connected by the switch 50C. A control part 50B detects the current value of the variable load 53. When the current value is not less than a predetermined lower limit, the control part 50B connects the terminal member 55 to the variable load 53 to supply the variable load 53 with the output from all stages of fuel cell stacks 20S connected in series to each other. However, when the current value falls below the predetermined lower limit, the control part 50B connects the downstream terminal member 52 to the variable load 53 to supply the variable load 53 with the output of the main power generation portion 51S. At the same time, the resistor load 84 is connected between the downstream terminal member 52 and the terminal member 55 to ensure that the current value of the sub power generation portion 52S is not less than the lower limit.

The term "lower limit" herein employed refers to such an output current as to ensure the flow of hydrogen gas enough to sufficiently concentrate impurity gas in the fuel flow path 42 of the fuel cell unit 45 constituting the sub power generation portion 52S to thereby prevent the impurity gas from diffusing upstream.

EMBODIMENT 3

Figure 12:
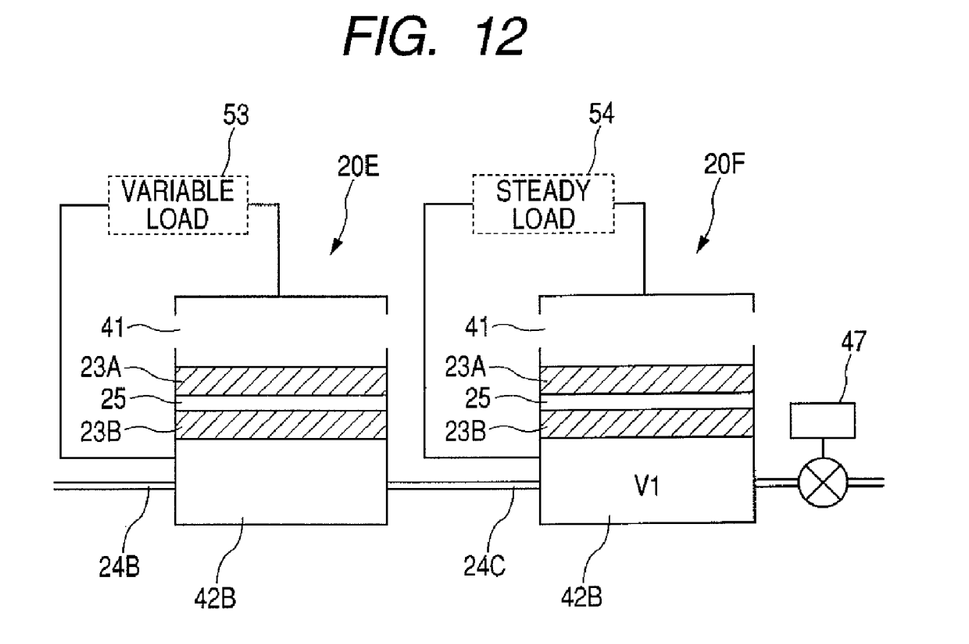
FIG. 12 is a schematic structural diagram of Embodiment 3.

FIG. 12 is a schematic diagram illustrating the configuration of a fuel cell stack of Embodiment 3. In Embodiment 1, the main and the sub power generation portions 51S and 52S are stacked to be disposed in one fuel cell stack 20A. On the other hand, in Embodiment 3, an independent sub power generation portion 20F is connected to the downstream in a fuel flow of an independent main power generation portion 20E. In FIG. 12, the elements which are common in function to those in FIG. 2 are identified by like numerals and characters and detailed description thereof will be omitted, which however does not mean that the elements identified by like numerals and characters are the same in dimension and material as those in FIG. 2.

As illustrated in FIG. 12, gas diffusion layers 23A and 23B which interpose a membrane electrode assembly 25 therebetween are disposed both in the main power generation portion 20E and in the sub power generation portion 20F. The gas diffusion layer 23A is supplied with oxygen in the atmosphere from the planar direction of the membrane electrode assembly 25 via an oxidizer flow path 41. The gas diffusion layers 23B is supplied with hydrogen gas via a fuel supply space 42B.

The fuel supply space 42B in the main power generation portion 20E is supplied with hydrogen gas via a fuel flow path inlet 24B. The fuel supply space 42B in the sub power generation portion 20F is connected to the downstream of the fuel supply space 42B in the main power generation portion 20E via a fuel flow path inlet 24C. The fuel supply space 42B in the sub power generation portion 20F is supplied with hydrogen gas from the fuel supply space 42B in the main power generation portion 20E via the fuel flow path inlet 24C. The purge valve 47 which discharges concentrated impurity gas stored in the fuel supply space 42B in the sub power generation portion 20F into the atmosphere is connected to the downstream of the sub power generation portion 20F.

A variable load 53 which is large in variation of output current is connected to the main power generation portion 20E. On the other hand, a steady load 54 which is small in variation of output current is connected to the sub power generation portion 20F located on the downstream side of in the fuel flow. The steady power generation in the sub power generation portion 20F allows hydrogen gas to continue flowing at a constant flow rate into the sub power generation portion 20F through the fuel flow path inlet 24C. The flow of hydrogen gas, even if the current of the variable load 53 is stopped, blocks concentrated impurity gas in the sub power generation portion 20F at the sub power generation portion 20F, so that the impurity gas hardly leaks toward the upstream.

Also in Embodiment 3, by detecting a change in the output of the sub power generation portion 20F and activating the purge valve 47, a purge operation with less wasteful discharge of hydrogen gas can be performed at an appropriate timing. In addition, the main power generation portion 20E can continue supplying electric power in quick response to a change in the variable load 53. Consequently, the fuel cell can be provided which can accommodate the output required by a device relatively large in variation of load and can generating stable power.

This application claims priority from Japanese Patent Application No. 2006-059181 filed on Mar. 6, 2006, which is hereby incorporated by reference herein.

The invention claimed is:

1. A fuel cell comprising:
a plurality of fuel cell units each having a fuel supply space into which a gaseous fuel is supplied and disposed with the fuel supply spaces communicating in series with each other;
a downstream power generation portion comprised of at least one of the fuel cell units located downstream in a fuel flow; and
an upstream power generation portion comprised of at least one of the fuel cell units located upstream of the downstream power generation portion such that the fuel passes through the fuel cell unit of the upstream power generation portion and is then supplied to the fuel cell unit of the downstream power generation portion,
wherein a load is connected to the downstream power generation portion which is smaller in variation of power than a load connected to the upstream power generation portion, and
wherein the load connected to the downstream power generation portion is a booster circuit.

2. The fuel cell according to claim 1, wherein the downstream power generation portion comprises the fuel cell unit located most downstream in the fuel flow, and a purge valve for discharging impurity gas stored in the fuel supply space to a most downstream position on a downstream side of the downstream power generation portion.

3. The fuel cell according to claim 1, further comprising a buffer space in communication with a downstream side of the downstream power generation portion, for storing therein impurity gas that intruded into the fuel supply space.

4. The fuel cell according to claim 1, wherein the downstream power generation portion is one of the fuel cell units which has one of the fuel supply spaces that is not connected in parallel to another of the fuel supply spaces.

5. The fuel cell according to claim 1, wherein the plurality of fuel supply spaces are in communication with each other in a cascade system in which the fuel supply spaces are connected in series such that a number of the fuel supply spaces connected in parallel to each other is gradually decreased toward a downstream side.

6. The fuel cell according to claim 1 in which the plurality of fuel cell units have a same planar shape, are stacked, and each have an oxidizer flow path communicating with an atmosphere, for taking in oxygen from the atmosphere in a planar direction of the fuel cell unit, which further comprises a separator member for separating the fuel supply space and the oxidizer flow path of the adjacent fuel cell units and electrically connecting the adjacent fuel cell units to each other in series, wherein a downstream terminal member is connected to the separator member, for extracting output current from the downstream power generation portion.

* * * * *